(12) United States Patent
Smith et al.

(10) Patent No.: US 8,764,391 B2
(45) Date of Patent: Jul. 1, 2014

(54) HYDROKINETIC TURBINE STRUCTURE AND SYSTEM

(75) Inventors: Timothy Smith, Birmingham, MI (US); Eric Otte, Williamston, MI (US)

(73) Assignee: Osirius International, Troy, MI (US)

( * ) Notice: Subject to any disclaimer, the term of this patent is extended or adjusted under 35 U.S.C. 154(b) by 586 days.

(21) Appl. No.: 12/879,397

(22) Filed: Sep. 10, 2010

(65) Prior Publication Data

US 2011/0058929 A1 Mar. 10, 2011

Related U.S. Application Data

(60) Provisional application No. 61/241,055, filed on Sep. 10, 2009.

(51) Int. Cl.
*F01D 1/02* (2006.01)
*F03B 13/26* (2006.01)

(52) U.S. Cl.
CPC ............... *F03B 13/264* (2013.01); *Y02E 10/38* (2013.01); *F05B 2240/133* (2013.01); *Y02E 10/28* (2013.01); *Y10S 415/906* (2013.01); *Y10S 415/908* (2013.01)
USPC ........ 415/191; 415/211.2; 415/220; 415/906; 415/908; 416/244 R

(58) Field of Classification Search
USPC .............. 415/191, 211.2, 220, 228, 906, 908; 416/175, 189, 198 R, 203, 244 R; 290/54, 43; 417/334
See application file for complete search history.

(56) References Cited

U.S. PATENT DOCUMENTS

| 188,020 | A | * | 3/1877 | Manley ........................ 416/188 |
| 2,501,696 | A | | 3/1950 | Souczek |
| 4,025,220 | A | | 5/1977 | Thompson et al. |
| 4,075,500 | A | * | 2/1978 | Oman et al. .................... 290/55 |
| 4,205,943 | A | | 6/1980 | Vauthier |
| 4,219,303 | A | | 8/1980 | Mouton, Jr. et al. |
| 4,274,009 | A | | 6/1981 | Parker et al. |
| 4,418,880 | A | | 12/1983 | de Waal |
| 4,524,285 | A | | 6/1985 | Rauch |
| 4,868,408 | A | | 9/1989 | Hesh |
| 6,168,373 | B1 | | 1/2001 | Vauthier |
| 6,531,788 | B2 | | 3/2003 | Robson |
| 6,956,300 | B2 | * | 10/2005 | Gizara ........................... 290/43 |
| 7,147,428 | B2 | | 12/2006 | Lamont |
| 7,258,523 | B2 | | 8/2007 | Williams |
| 2008/0238105 | A1 | * | 10/2008 | Ortiz et al. ..................... 290/54 |
| 2008/0277940 | A1 | | 11/2008 | Krouse |
| 2009/0185904 | A1 | | 7/2009 | Landberg |

* cited by examiner

*Primary Examiner* — Edward Look
*Assistant Examiner* — Juan G Flores
(74) *Attorney, Agent, or Firm* — Dickinson Wright, PLLC

(57) ABSTRACT

A hydrokinetic turbine system, including a plurality of hydrokinetic turbines is installed on a bed of a body of water. Each turbine has a shroud with a forward entrance portion and rear exit portion. The shroud includes a propeller disposed in a middle portion thereof. An inner surface of the shroud includes a plurality of rifling vanes formed therein to induce water entering the forward entrance portion to rotate in a vortex-like fashion. A plurality of pre-spin guard blades disposed adjacent the forward entrance portion also induce rotation of water and serve to provide a barrier preventing objects from passing into the forward entrance portion. A plurality of stabilizers extending from an exterior surface of the shroud that position the forward entrance portion in the direction of current flow.

17 Claims, 5 Drawing Sheets

HYDROKINETIC TURBINE STRUCTURE AND SYSTEM

CROSS-REFERENCE TO RELATED APPLICATIONS

The present invention claims priority from U.S. Provisional Patent Application Ser. No. 61/241,055, filed Sep. 10, 2009, and entitled "Hydrokinetic Turbine", the specification of which is hereby incorporated by reference as though set forth fully herein.

TECHNICAL FIELD

The present invention relates generally to the field of hydroelectric power. More particularly, the present invention relates to an improved system and apparatus for converting water flow into electric current, especially in areas of low current flow.

BACKGROUND OF THE INVENTION

A global problem that is receiving a lot of attention is how to supply energy to the population of the world. As a proposed solution, many believe that it would be highly beneficial if the use of fossil fuels was decreased and replaced with renewable sources of energy. Accordingly, efforts have been made to harness natural kinetic resources to meet ever increasing electrical power generation needs. However, about 90% of U.S. electric production sill comes from nonrenewable sources.

A significant percentage of the efforts to use renewable sources of energy has been concentrated on wind powered systems. In the U.S., wind powered systems currently only account for about 10% of renewable electricity sources despite wind systems having increased in their prevalence by 35% from the period of April 2008 to April 2009, according to Energy Information Association ("EIA") Reports. Conversely, while conventional hydroelectric systems account for about 77% of the U.S. renewable energy supply, they have fallen out of favor in the U.S. as more evidence is uncovered on the potential enormous environmental and geological impact created by such systems.

One of the principal reasons for the small percentage of wind powered generating systems is that they suffer from the obvious problem that wind energy is inherently intermittent. Wind power generating systems are also somewhat limited in terms of where they can be located and typically, need to be located in areas that are known to experience a significant amount of wind. This presumes that these high wind areas would be susceptible to construction of such wind power generating systems, which they frequently are not.

Common hydroelectric systems include submersible plants for producing electricity from ocean currents. Those plants are typically fastened to the sea bottom by wires and comprise turbines arranged to be driven by tidal water. However, the power generated from submersible plants needs to be increased without substantially increasing the energy gathering costs in order for this energy source to be commercially attractive.

Consequently, vast scientific and financial resources have been expended in pursuit of hydrokinetic turbines which can convert kinetic energy within a normal flow of a body of water into a useful amount of electrical energy at a reasonable cost. Despite these efforts, hydrokinetic turbines deployed in the normal flow of a body of water have nevertheless not been successfully developed to the point where they can deliver adequate amounts of electric power at a reasonable "per kilowatt hour" cost, with an acceptable level of reliability. This is complicated by the fact that hydrokinetic power systems are limited by the number of available locations for their installation and typically can only provide the desired results in rivers that are fast flowing and deep.

In addition to the limitations with hydrokinetic systems, the successful deployment of the individual hydrokinetic turbines is also inherently problematic. First, the rotation of a turbine about an axis in one direction generates an equal yet opposing counter-torque in the opposite direction. To counteract this counter-torque and maintain stability of the hydrokinetic turbine, a mounting apparatus such as a series of anchored support posts or columns are attached to the hydrokinetic turbine and then anchored to a stationary structure, such as the floor of a river, a bridge or some other immovable object. While this serves to stabilize the hydrokinetic turbine, it prevents ease of adjustment of the turbine location to a different point within the moving body of water where current flow is optimum. As the characteristics of the flowing body of water change due to an increased volume of water, freezing, etc., the point of optimum flow also changes. The lack of mobility of a deployed hydrokinetic turbine limits the adaptability of the turbine to such differing conditions and creates a corresponding decrease in the efficiency of the system.

Further, existing hydrokinetic turbines are relatively expensive. Conventional turbines, and specifically hydrokinetic turbines, have typically been constructed of steel or lightweight metal such as marine aluminum for a variety of reasons. First, constructing these of metal provides increased durability, particularly in harsh surroundings. Second, a fairly heavily weighted turbine housing, in conjunction with conventional anchoring mechanisms described above, provides the configuration best able to withstand and minimize the effects of counter-torque generated by rotation of the turbine blades and shaft. On the downside, the cost of manufacturing a hydrokinetic turbine from a metal material is extremely expensive.

Accordingly, there exists a need for a hydrokinetic turbine which overcomes the existing problems with hydrokinetic technology. More specifically, there exists a need for a hydrokinetic turbine which can be stabilized in a path of water flow without complex anchoring mechanisms. There is a further need for a hydrokinetic turbine which can be placed in a particular optimal position in a path of water flow, then easily maneuvered to a different position within the body of water in the event of a change of location of the optimal path of water flow. Finally, there is a need for a hydrokinetic turbine unit complying with the above-stated needs which is also economical to build and operate.

SUMMARY OF THE INVENTION

It is therefore an advantage of the present invention to provide a hydrokinetic turbine system for inclusion in a body of water that provides reliable power generation and which does not significantly affect the hydrologic or ecologic system of the body of water.

It is another advantage of the present invention to provide a hydrokinetic turbine system that can be easily installed into a body of water when compared to prior systems.

It is still another advantage of the present invention to provide a hydrokinetic turbine system that can be readily removed from a body of water when compared to prior systems.

It is a further advantage of the present invention to provide a hydrokinetic turbine system that provides increased efficiency in a body of water that has a relatively low current flow.

It is a related advantage of the present invention to provide a hydrokinetic turbine system that provides increased energy generation from current flow in a body of water.

In accordance with the above and the other advantages of the present invention a hydrokinetic turbine system, including a plurality of hydrokinetic turbines is provided. Each turbine is installed on a floor or bed of a body of water and includes a shroud having a forward entrance portion and rear exit portion. The shroud includes a propeller disposed in a middle portion thereof. An inner surface of the shroud includes a plurality of rifling vanes formed therein to induce water entering the forward entrance portion to rotate in a vortex-like fashion. A plurality of pre-spin guard blades disposed adjacent the forward entrance portion also induce rotation of water and serve to provide a barrier preventing objects from passing into the forward entrance portion. A plurality of stabilizers extending from an exterior surface of the shroud allow for passive positioning of the forward entrance portion in the direction of current flow.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
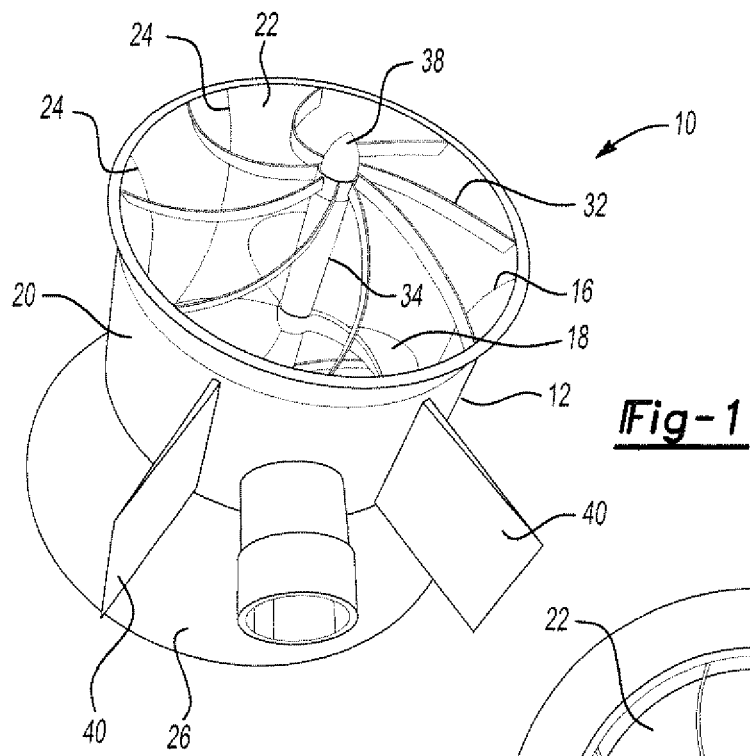
FIG. 1 is a rear perspective view of a hydrokinetic turbine in accordance with a preferred embodiment of the present invention.
Figure 2:
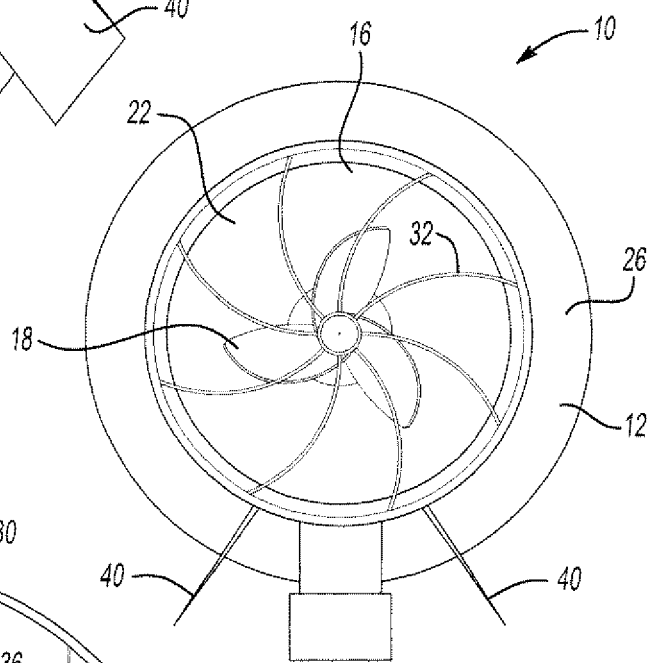
FIG. 2 is a rear view of a hydrokinetic turbine in accordance with a preferred embodiment of the present invention.
Figure 3:
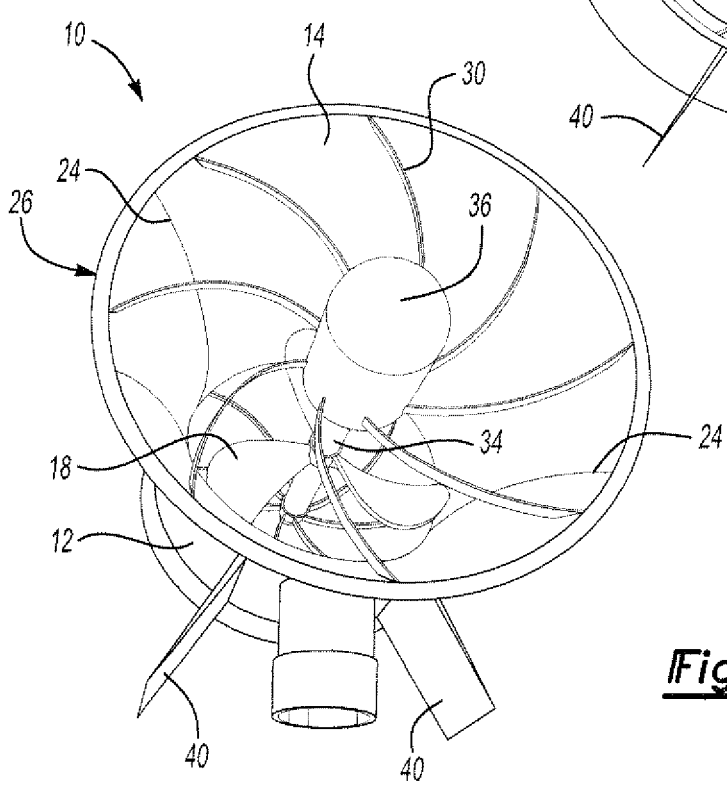
FIG. 3 is a front perspective view of a hydrokinetic turbine in accordance with a preferred embodiment of the present invention.
Figure 4:
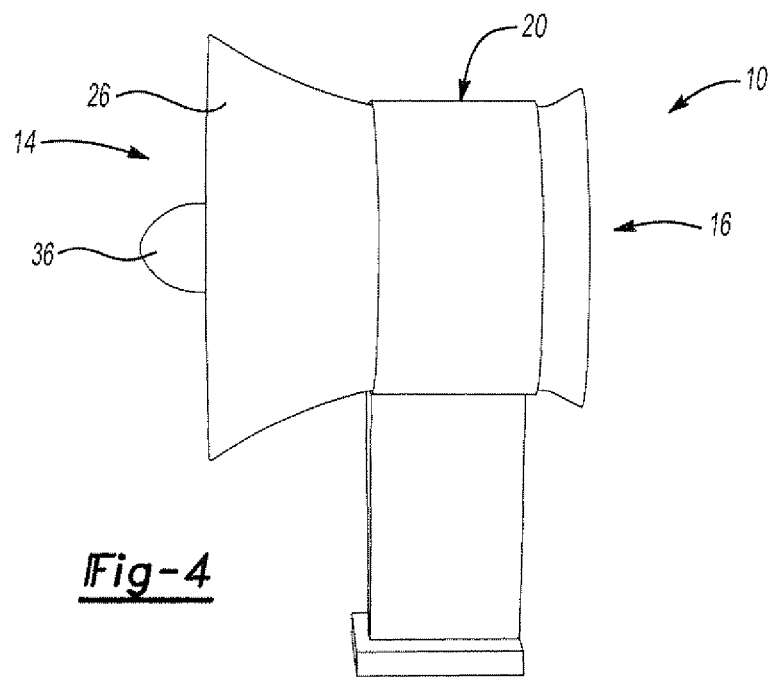
FIG. 4 is a side view of a hydrokinetic turbine in accordance with a preferred embodiment of the present invention.
Figure 5:
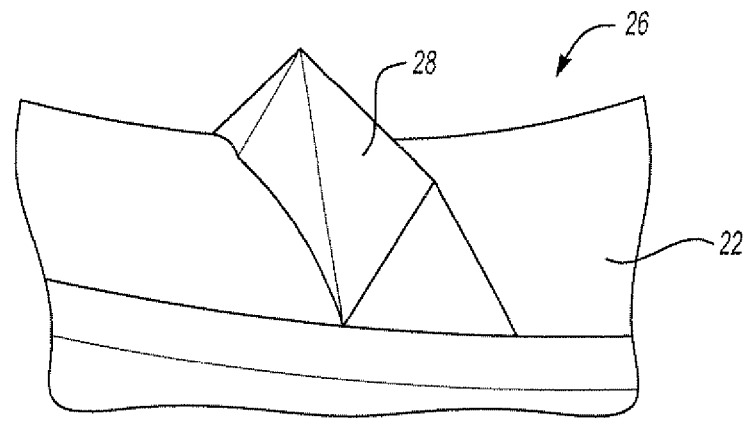
FIG. 5 is a schematic illustration of a rifling vane on a shroud of a hydrokinetic turbine in accordance with a preferred embodiment of the present invention.
Figure 6:
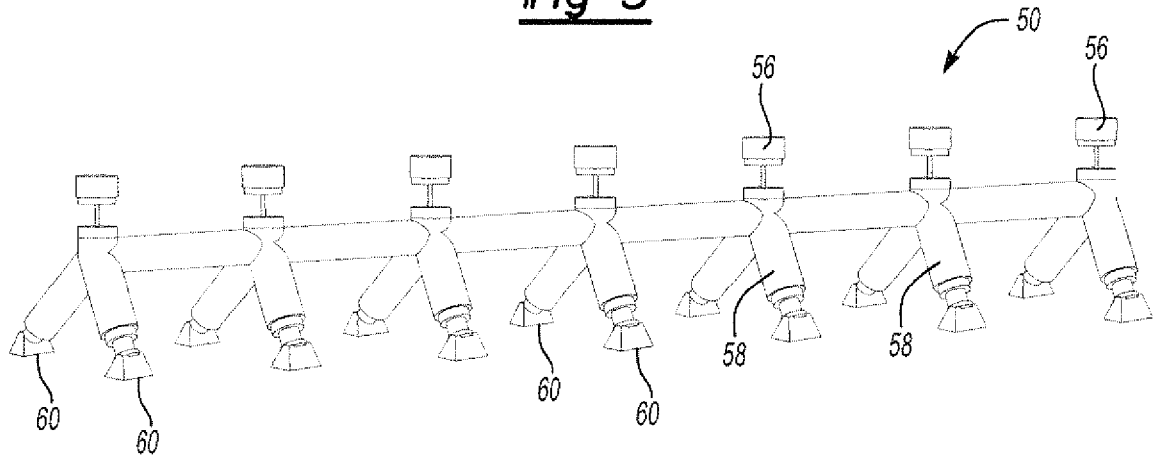
FIG. 6 is a schematic illustration of a lattice anchoring frame for a hydrokinetic turbine system in accordance with a preferred embodiment of the present invention.

As is known, hydrokinetic power utilizes natural water movement to generate electricity and includes wave, tidal, and river-based applications. The invention disclosed system generates electricity from natural water movement. Referring now to the Figures, the present invention relates to a hydrokinetic turbine system, including a plurality of hydrokinetic turbines, for inclusion in a body of water. It will be understood that the hydrokinetic system can be incorporated into any body of water, such as an ocean, a lake, a river, or a stream. In accordance with one embodiment, the present invention may be incorporated into a river that has a slow, but relatively constant current flow and also is only of moderate depth. However, the disclosed system may obviously be employed in other bodies of water.

Referring to FIGS. 1 through 5, which illustrate a hydrokinetic turbine 10 in accordance with the present invention. The hydrokinetic turbine 10 is preferably incorporated into a hydrokinetic system 5 that is comprised of a plurality of hydrokinetic turbines 10, as discussed in more detail below. Each of the hydrokinetic turbines 10 has the same configuration and the description of one applies to all. As shown, the hydrokinetic turbine 10 preferably includes a shroud 12 having a forward entrance portion 14 and a rear exit portion 16. The forward entrance portion 14 is oriented upstream so that it faces the direction of water flow and thus receives water therein. The rear exit portion 16 is oriented downstream so that water passing through the shroud 12 exits the turbine 10 therefrom. A rotating propeller 18 is disposed within the shroud 12. The propeller 18 is preferably disposed in a middle portion 20 of the shroud 12.

The shroud 12 is configured for maximum water acceleration through the middle portion 20 where the propeller 18 is disposed. In accordance with a preferred embodiment, the shroud 12 has a tapered middle portion 20 with the forward entrance portion 14 and the rear exit portion 16 each expanding outward from the middle portion 20. The shroud 12 thus employs Bernoulli's principles and the Venturi effect as will be understood by one of ordinary skill in the art. The shroud 12 is preferably constructed of a metal material. However, a variety of other suitable materials, such as plastic or composite, may also be employed.

In operation, the hydrokinetic turbine 10 is oriented within the water in the direction of flow of water. Thus, the fluid enters the forward entrance portion 14 of the hydrokinetic turbine 10 and causes the propeller 18 within the shroud 12 to rotate or spin. The rotational motion of the propeller 18 can be used to generate electrical energy. This electric energy can then be transferred to an electric grid where it can added to a power supply for use by energy consumers. It will be understood that normally, the faster the fluid flow, the greater the amount of electrical energy created.

The shroud 12 has an inner surface 22 that includes stationary rifling vanes 24 formed therein. The rifling vanes 24 are preferably uniformly spaced around the circumference of the inner surface 22 of the shroud 12. The rifling vanes 24 preferably extend the length of the shroud 12 and are integrally formed in the shroud 12. However, it will be understood that the rifling vanes 24 could instead extend only along the forward portion 26 of the shroud 12 and up to the middle portion 20 where the propeller 18 is located. The configuration of the rifling vanes 24 is similar to rifling on a barrel of a gun except that the rifling vanes 24 protrude from the inner surface 22. It will be understood that the rifling vanes 24 can take on a variety of other suitable configurations or shapes. For example, the rifling vanes, could be configured as grooves instead of protrusions. Alternatively, the rifling vanes could be a non-integral structure. The rifling vanes 24 preferably have a straight portion 28 that is located at the forward entrance portion 14 and a curved portion along the remainder of the inner surface 22 along which the rifling vanes 24 extend. The rifling vanes 24 preferably align with the pre-spin blade guards, discussed below, to coordinate spiraling of the water.

The rifling vanes 24 influence the water in the shroud 12 into a rotating, vortex-like motion with the rotation matching the direction of spin of the propeller 18. This serves two purpose. First, the water naturally want to form vortices, such as when a bathtub is drained. Thus, by forming a rotating vortex, flow resistance and turbulence is lowered, which increases the efficiency/output from the turbine 10. Second, by rotating the water as it enters the turbine 10 in the same direction as the propeller 18, the efficiency and power output of the turbine 10 can be further increased.

As discussed above, the forward entrance portion 14 of the shroud 12 includes a slightly flared portion that acts somewhat as a funnel. Additionally, a plurality of front pre-spin vanes or blade guards 30 are disposed adjacent the forward entrance portion 14. A plurality of rear pre-spin vanes or guards 32 are disposed adjacent the rear exit portion 16. These pre-spin vanes are disposed on a rotor shaft 34 and serve a variety of different functions. It can be appreciated that the pre-spin blade guards 30, 32 form the link between the shroud 12 and the guts of the turbine 10, namely the rotor, propeller, and nacelle. The pre-spin vanes 30, 32 are preferably constructed of stainless steel or carbon fiber so that they are strong enough to support the system. It will be understood that they could be formed of a variety of other suitable materials.

The front pre-spin vanes 30 support a front bearing 36 on the rotor shaft 34 at the forward entrance portion 14 of the turbine 10. The rear pre-spin vanes 32 support the nacelle 38, which is extremely heavy. Thus, the rear pre-spin vanes 32 are preferably larger and stronger than the front pre-spin vanes 30. The pre-spin vanes 30, 32 are preferably spiraled and curved to add spin to the water as it enters the shroud 12, thereby increasing efficiency. However, the pre-spin vanes can have a variety of other suitable shapes. The front pre-spin vanes 30 act as a blade guard to prevent large fish, debris, people and other items from entering the turbine 10. The front pre-spin vanes 30 preferably extend in front of the shroud 12 and sweep back to deflect objects around the shroud 12. The number of blades, and the spacing of the blades seek to balance free flow of water through the turbine 10 and prevent humans from entering and thus vary as will be understood by one of ordinary skill.

Further, the front pre-spin vanes 30 add "pre-spin" to the water, similar to the rifling vanes 24 discussed above. They accomplish this by spiraling back from the front bearing 36 towards the shroud 12, and are also slightly angled to influence the water to begin to rotate. As stated above, the front pre-spin vanes 30 mate with the rifling vanes 24 so that they generally match up. This pre-spin helps increase the efficiency and output of the turbine 10. While the rear pre-spin vanes 32 do not pre-spin the water since they are located rearwardly of the propeller 18 and the water is already rotating, but they further influence the rotating motion of the water.

The rear exit portion 14 includes a generator, which is preferably located inside the nacelle 38 to convert the rotational energy of the propeller 18 to electric energy. In a preferred embodiment, the generator is a permanent-magnet, direct-drive, low RPM generator. The generator preferably produces 50 kW at 60 RPM without the need for the use of a gearbox. It will be understood that a variety of other generators can be utilized.

The propeller 18 can take on a variety of different configurations and in one embodiment, it has a standard 3 or 6 blade design with blades that begin near the front of the rotor 34 behind the support bearing 36. Obviously, the number of blades is not critical and can vary. Alternatively, the propeller 18 may have a hybrid design that more effectively captures energy from the water flow therethrough. With this hybrid design, the propeller 18 includes a combination of a typical propeller and an auger or screw propeller. The blades spiral along the length of the rotor 34, like an auger blade. However, the radius of the blades increases as they move along the length of the rotor 34. The blades emerge from the rotor 34 near the front and gradually increase in radius as they spiral back, peaking at the most-tapered part of the shroud 12, where the blades "swell" into a more common propeller shape that fits the cavity of the shroud 12. The hybrid propeller may be either attached to the rotor 34, or formed as one piece with the rotor 34. The propeller 18 is preferably constructed of a lightweight material such as fiberglass to more easily rotate. This propeller configuration both alone and in connection with the water spin concepts assist in increasing the efficiency/output of turbine 18.

The outer surface of the shroud 12 preferably includes a plurality of stabilizers 40 extending therefrom to assist the turbine 12 in aligning itself with the direction of the current. The stabilizers 40 consist of two structures on opposite halves of the turbine 10 that are configured to move the turbine 10 based on the direction of the water current so that the forward entrance portion 14 faces the direction of the current. In one embodiment, the turbine 10 can yaw up to fifteen degrees in either direction due to the bearing system, discussed in more detail below. The stabilizers 40 thus allow the entire turbine 10 to align itself with the flow of current passively (without use of motors or a control system). This increases the efficiency and power output of the turbine 10.

Referring now to FIGS. 6 through 9, a hydrokinetic system 5 is illustrated. The hydrokinetic turbines 10 are preferably incorporated into a system so as to produce industry-level power. In accordance with a preferred embodiment, an individual hydrokinetic turbine generates around 50 kW with a 3 meter diameter blade. To produce higher industry-level power in the megawatt (MW) range, a plurality of turbines 10 are setup in a system or farm. These systems 5 can have more than 100 units. However, the system 5 can have more or less units as desired. Installing a system consisting of multiple turbines 10 presents a challenge in setup up and anchoring all of the turbines 10 to the floor of the river or other body of water. The preferred system 5 thus employs a large "lattice" support structure 50 is installed first (without turbines attached) and then rests on the river floor 54 with no drilling required. Alternatively, drilling could be performed to secure the lattice support structure 50 to the river floor 54. The lattice support structure 50 is lowered onto the river floor 50 as a unit and preferably creates a stable and relatively flat frame on the river floor 50. The support structure 50 is a wide structure with a plurality of docking ports 56 located along the length of the support structure 50 where turbines 10 can be quickly and easily attached and detached.

The lattice structure 50 is preferably constructed of heavy duty steel or polymer tubing. A plurality of support legs 58 extend from the structure 60. The support legs 58 are generally located under each docking port 56. Inside each support leg 58 is a heavy duty spring that pushes an associated anchoring foot 60 out toward the river floor 54. This allows the support structure 50 to bend to fit the contour of the river floor 54. The spring loaded support legs 58 with anchoring feet 60 allow the support structure 50 to account for a degree of unevenness in the river floor 54. For river floors 54 that have a larger degree of unevenness, the support legs 58 could be configured as telescopic pieces that will account for larger variations. In the case of narrow rivers or very uneven or rocky floors, an anchoring system, as is known in the art, may alternatively be employed to secure each turbine to the river floor 54.

Each docking port 50 along the support structure 50 physically attaches to the turbine 10 with a quick-lock mechanism, allowing each of the turbines 10 to be easily snapped in and out of the support structure 50. The support structure 50 also allows the wiring for each of the turbines 10 to be easily hooked up and out of view. Specifically, the wiring passes through the interior of the support structure 50, such that when it is installed on the river floor 54, the wiring is installed at the same time. Additionally, each turbine 10, at its connection point, includes a water proof electrical plug that will mate to a similar electrical receptacle inside the docking port 56. The wiring from all the turbines runs through these connectors, into the support structure 50, and exits along the side of the support structure 50 to be run to shore. This further assists in simplifying the installation process and ensures no loose wires hanging from the turbines 10.

Figure 7:
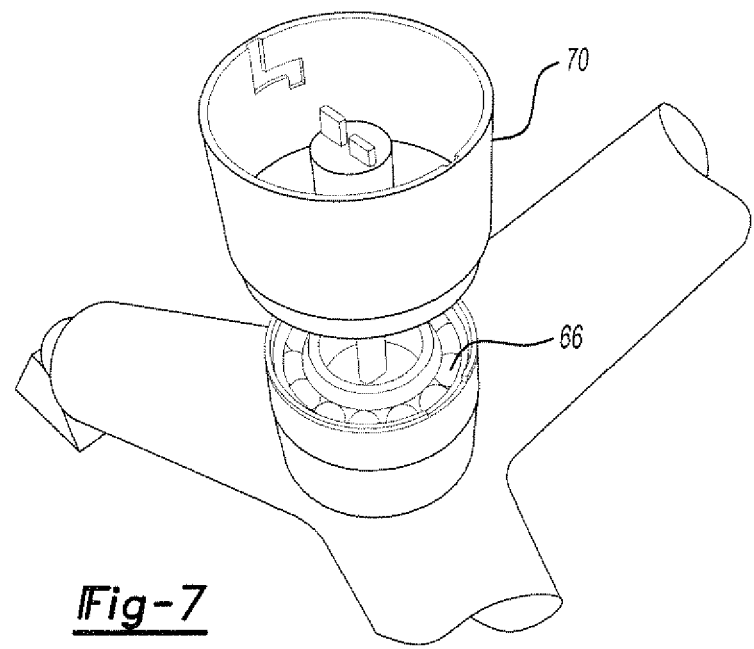
FIG. 7 is a schematic illustration of a docking port on a lattice anchoring frame for receipt of a hydrokinetic turbine in accordance with a preferred embodiment of the present invention.
Figure 8:
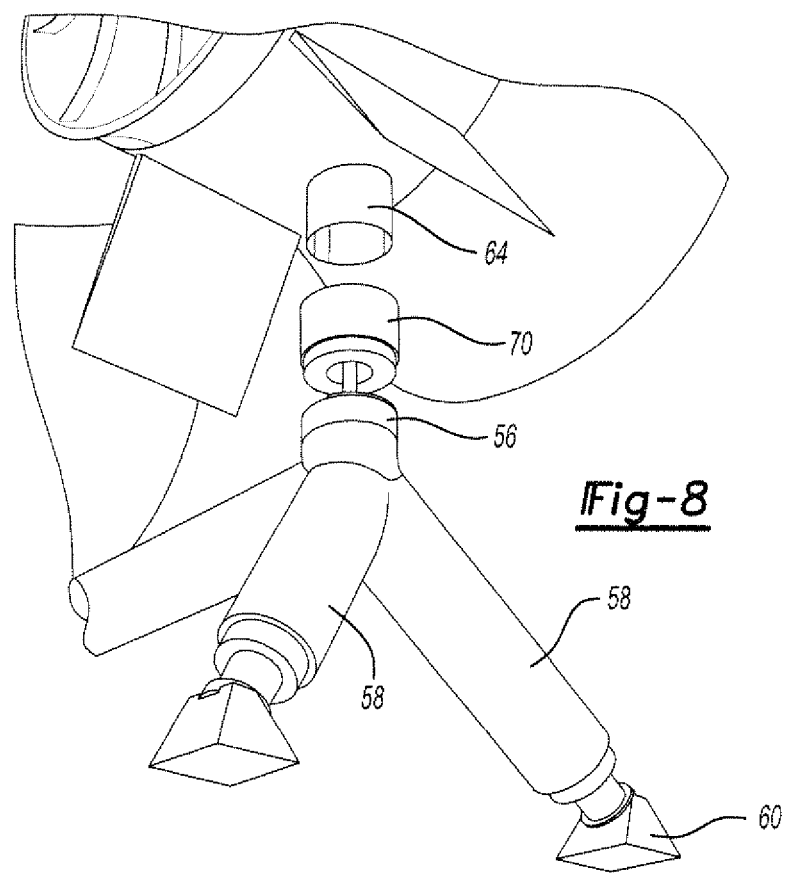
FIG. 8 is a schematic illustration of a hydrokinetic turbine being coupled to a docking port on a lattice anchoring frame in accordance with a preferred embodiment of the present invention.
Figure 9:
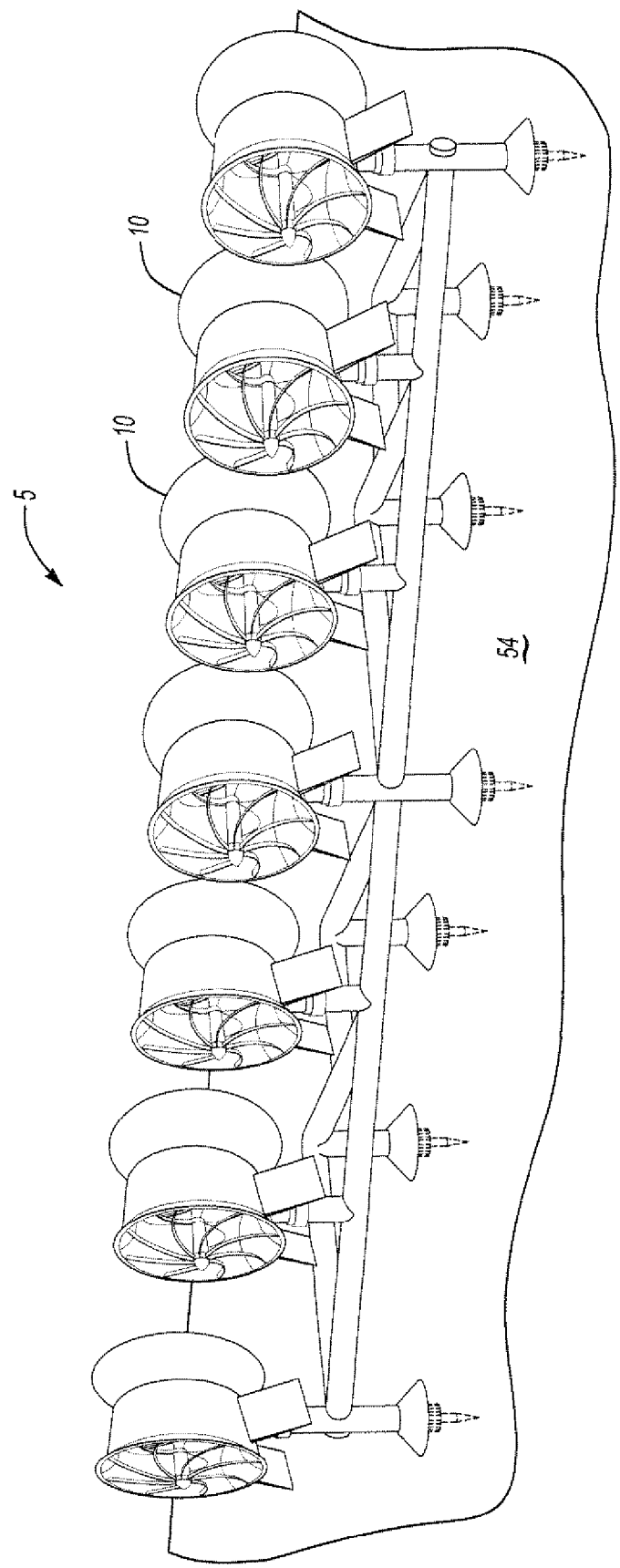
FIG. 9 is schematic illustration of a hydrokinetic turbine system installed on a bed of a body of water in accordance with preferred embodiment of the present invention.
Figure 10:
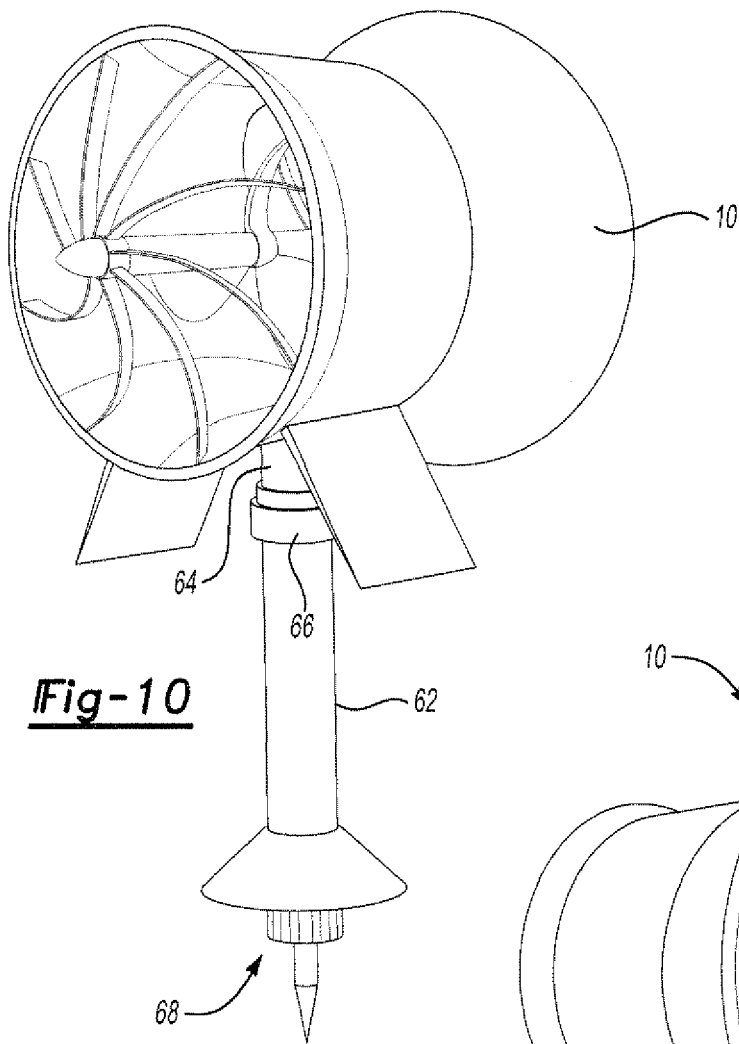
FIG. 10 is a perspective view of a hydrokinetic turbine rotated in one direction in accordance with a preferred embodiment of the present invention.
Figure 11:
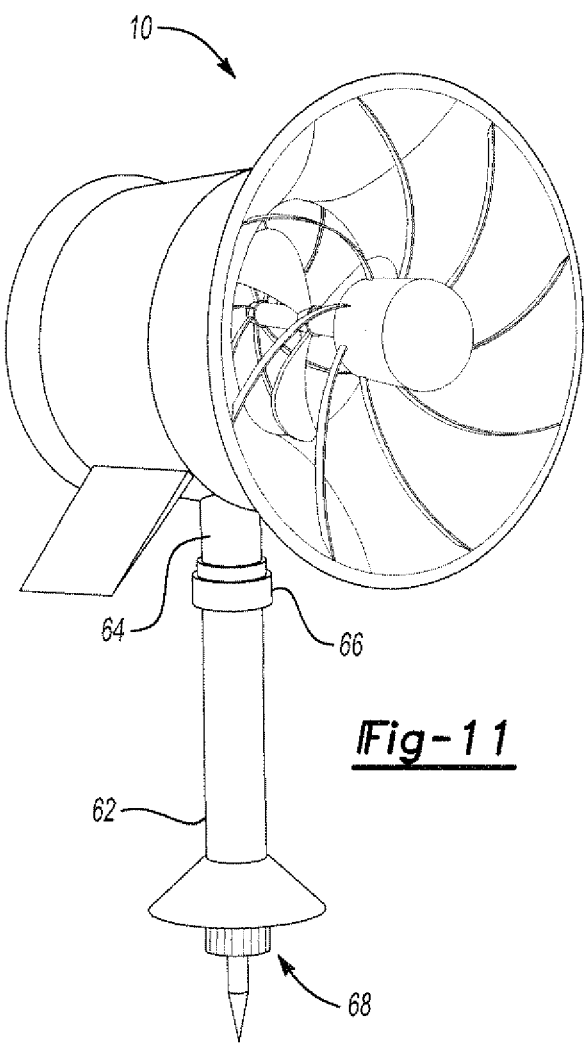
FIG. 11 is a perspective view of a hydrokinetic turbine rotated in an opposite direction in accordance with a preferred embodiment of the present invention.

With reference to FIGS. 10 and 11, the turbine 10 includes a support stem 62 that extends between the turbine bottom pipe 64 and the docking port 56. As shown in FIGS. 7 and 8, this connection is effectuated by a cup connector 70. The turbine 10 is rotatable with respect to the support stem 62 at the bearing 66. The connection point 68 of the turbine 10 to the docking port 56 is illustrated in these figures.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A hydrokinetic turbine system, comprising:
    a plurality of hydrokinetic turbine units disposed in a body of water, each of said hydrokinetic turbine units having a shroud with a forward entrance portion and rear exit portion;
    a propeller disposed in a middle portion of said shroud;
    a plurality of rifling vanes formed on an inner surface of said shroud to induce water entering said forward entrance portion to rotate in a vortex-like fashion;
    a plurality of front pre-spin vanes disposed adjacent said forward entrance portion to also induce rotation of water entering said forward entrance portion and to prevent objects from passing into the forward entrance portion; and
    a plurality of rear pre-spin vanes disposed adjacent said rear exit portion of said turbine units.

2. The hydrokinetic turbine system of claim 1, wherein each of said plurality of hydrokinetic turbine units includes a plurality of stabilizers extending from an exterior surface of said shroud that serve to position said forward entrance portion in the direction of current flow.

3. The hydrokinetic turbine system of claim 1, wherein said shroud has a forward portion that is tapered outwardly with respect to said middle portion.

4. The hydrokinetic turbine system of claim 1, wherein said propeller is a standard blade propeller that is disposed on a rotor shaft within said shroud.

5. The hydrokinetic turbine system of claim 1, further comprising:
    a lattice support structure that retains said plurality of hydrokinetic turbine units with respect to a floor in said body of water.

6. The hydrokinetic turbine system of claim 5, wherein said lattice support structure includes a plurality of docking ports for receipt of a respective one of said plurality of hydrokinetic turbine units.

7. The hydrokinetic turbine system of claim 6, wherein said lattice support structure includes a plurality of anchoring feet that account for unevenness in said floor in said body of water.

8. A hydrokinetic turbine system, comprising:
    a lattice support structure disposed in a body of water, said lattice support structure including a plurality of anchoring feet for contacting a floor of said body of water;
    a plurality of docking ports formed in said lattice support structure, each of said plurality of docking ports configured for receipt of one of a plurality of hydrokinetic turbine units;
    each of said plurality of hydrokinetic turbine units having a shroud with a forward entrance portion, a middle portion tapered inwardly with respect to said forward entrance portion, and a rear exit portion;
    a propeller disposed in said middle portion;
    a plurality of rifling vanes formed on an inner surface of shroud in said forward entrance portion;
    a plurality of wires disposed within said lattice support structure that connects each of said plurality of turbine units to shore when disposed in one of said plurality of docking ports.

9. The hydrokinetic turbine system of claim 8, wherein said lattice support structure includes a plurality of telescopic legs that allow a height of said lattice support structure to be raised and lowered.

10. The hydrokinetic turbine system of claim 9, wherein said plurality of hydrokinetic turbines include a plurality of front pre-spin vanes disposed adjacent said forward entrance portion to induce rotation of water entering said forward entrance portion and to prevent objects from passing into the forward entrance portion.

11. The hydrokinetic turbine system of claim 10, wherein said plurality of pre-spin vanes are aligned with said plurality of rifling vanes.

12. The hydrokinetic turbine system of claim 9, wherein each of said plurality of hydrokinetic turbine units includes a plurality of stabilizers extending from an exterior surface of said shroud that serve to position said forward entrance portion in the direction of current flow.

13. The hydrokinetic turbine system of claim 12, wherein a bearing is disposed between said hydrokinetic turbine unit and said docking port to allow rotation of said hydrokinetic turbine.

14. The hydrokinetic turbine system of claim 9, wherein each of said plurality of turbine units includes a plurality of rear pre-spin vanes disposed adjacent said rear exit portion of said turbine units.

15. The hydrokinetic turbine system of claim 9, wherein said propeller is a standard blade propeller that is disposed on a rotor shaft.

16. The hydrokinetic turbine system of claim 9, wherein said propeller is a hybrid type that is disposed on a rotor shaft.

17. A hydrokinetic turbine unit, comprising:
    a shroud with a forward entrance portion, a middle portion tapered inwardly with respect to said forward entrance portion, and rear exit portion;
    a propeller disposed in said middle portion of said shroud;

a plurality of rifling vanes formed on an inner surface of said shroud to induce water entering said forward entrance portion to rotate in a vortex-like fashion; and a plurality of front pre-spin vanes disposed adjacent said forward entrance portion to also induce rotation of water entering said forward entrance portion and to prevent objects from passing into the forward entrance portion, said plurality of rifling vanes aligned with respect to said plurality of rifling vanes;

a plurality of rear pre-spin vanes disposed adjacent said rear exit portion of said turbine units; and a plurality of stabilizers extending from an exterior surface of said shroud that serve to position said forward entrance portion in the direction of current flow.

* * * * *